United States Patent Office 3,272,341
Patented Sept. 13, 1966

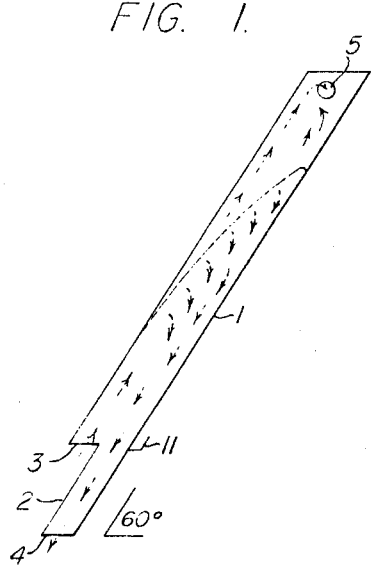
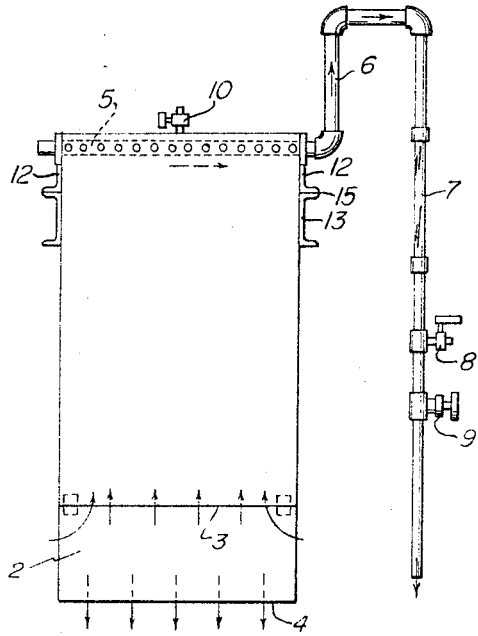
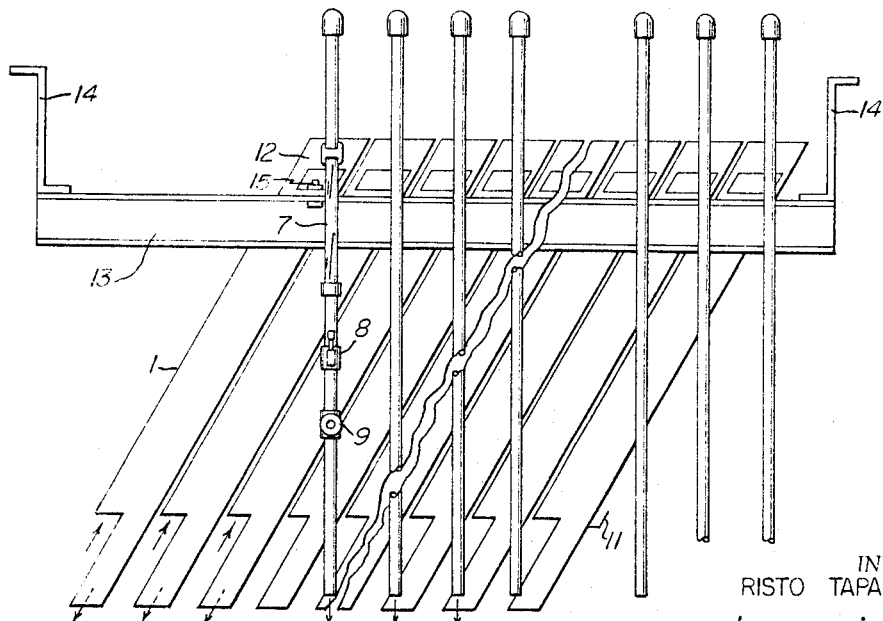

3,272,341
WET SEDIMENTATION APPARATUS
Risto Tapani Hukki, Otakallio, Otaniemi, Finland, assignor to Insinooritoimisto-Engineering Bureau R. T. Hukki, Otakallio, Otaniemi, Finland
Filed Sept. 21, 1961, Ser. No. 139,807
7 Claims. (Cl. 210—322)

This invention relates to an improvement in the apparatus used for continuous wet sedimentation of suspensions.

In industrial practice, continuous wet sedimentation of suspensions is conducted in cylindrical or rectangular tanks or vessels called thickeners. The feed is usually introduced through a feed well at the top center of the tank or vessel. The slurry settles below the feed well. The thickeners are also equipped with slowly revolving rakes for moving the thickened sludge to the central discharge at the bottom center of the apparatus. The clear fluid flows to the periphery and is withdrawn by overflowing a circumferential weir. Of this conventional type, a number of modifications have been developed.

It has been known for many decades that settling of suspensions in a space confined by parallel inclined walls takes place at a more rapid rate than in a vertical column. Descriptions of apparatus in which the above principle is applied can be found in literature related to thickening. As a particular example, inclined baffles immersed in a thickening tank have been used to increase the settling capacity of the thickener. Although basically sound, such arrangements have found only very limited use due to the constructional imperfection of the apparatus itself.

This invention is concerned with further developments in sedimentation apparatus of this general type.

The most characteristic feature of the invention concerns the design of the baffles, which are now provided with positive means to establish a fully controllable laminar flow of pulp in an inclined upward direction from a point of lower elevation toward a point of higher elevation. Such means are also used to provide for very convenient discharge of the clarified liquid, while the solids separated from the feed pulp descend downward by gravity in accordance with well-known principle. By virtue of this new construction, the operating principle of the entire sedimentation apparatus becomes radically different when compared with conventional units, or even with the earlier attempts to apply inclined baffles. Furthermore, tests carried out in many industrial plants have shown that the thickening capacity of the new apparatus is many times greater than that obtainable in present practice.

The apparatus used in industrial applications of this invention consists of two major parts, in the following called the sedimentation aggregate and the sedimentation tank.

The sedimentation aggregate is a combination of any desired number of basic sedimentation units, called sedimentation elements, placed side by side or apart from each other. Each sedimentation element is preferably a narrow rhomboidal box provided with sloping parallel walls and with means for the laminar introduction and discharge of pulp. Within each sedimentation element, the pulp separates into two distinctly different layers, the bottom layer consisting of the settled solids, which are continuously discharged by gravity and by hydrostatic pressure via an open discharge channel situated below and in stepped relationship with an entrance channel, and the top layer, consisting now of more or less clear liquid, which is discharged by controlled flow through a discharge pipe, preferably a siphon, connected to the closed top part of the element. Furthermore, the sedimentation element is designed to facilitate easy manufacturing and easy combination of the units into groups.

The sedimentation tank is a tank or vessel into which the sedimentation aggregate is placed or immersed. The tank is also used for receiving the original feed pulp to be thickened and for the final discharge of the thickened product.

In the accompanying drawings:

FIG. 1 is a side elevation view of the sedimentation element;

FIG. 2 is a front view of the sedimentation element;

FIG. 3 is a side view of a sedimentation aggregate consisting of a group of sedimentation elements.

Figure 4:
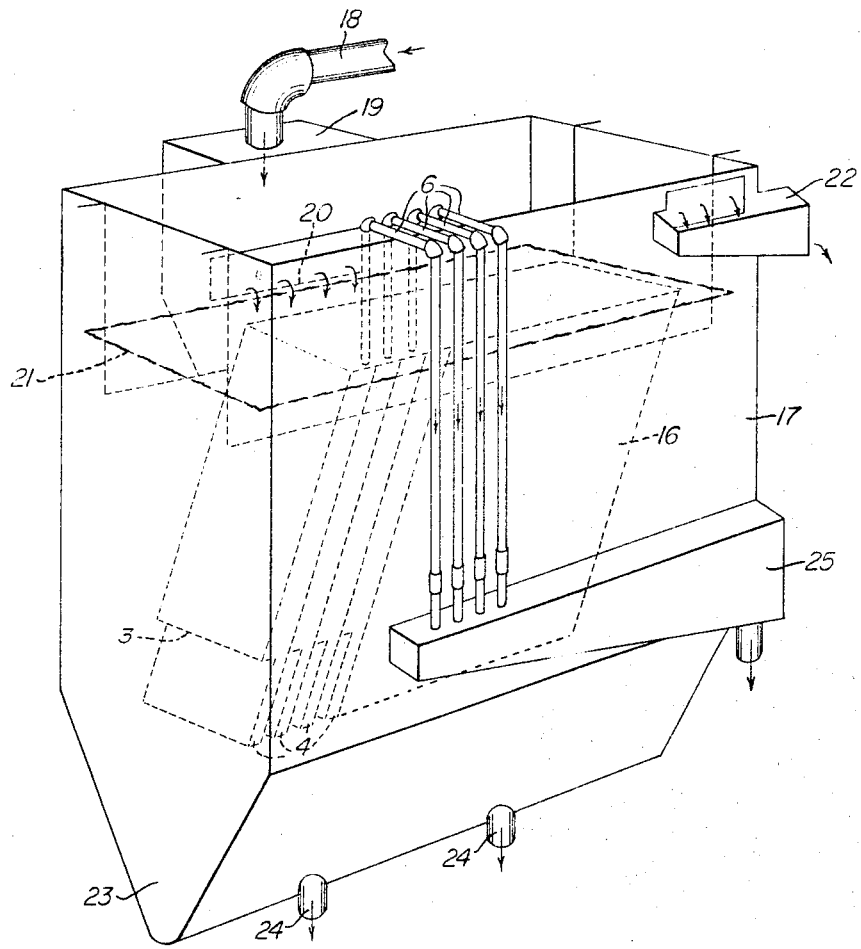
FIG. 4 is a view of the sedimentation aggregate placed into a sedimentation tank for the practice of the invention.

Referring to the drawings, FIGS. 1 and 2 show a sedimentation unit conforming to the invention and adapted for use in the wet sedimentation tank of FIG. 4. As can be seen from FIGS. 1 and 2, the sedimentation unit is in the form of an elongate, longitudinally rectilinear box 1 having imperforate walls, closed top, and open bottom of stepped formation defining, by means of an intermediate but exterior wall 2, separate bottom inflow and outflow openings 3 and 4, respectively, exteriorly of the unit and facing in the same direction, but offset relative to each other along the length of the box by an intermediate but exterior wall, so as to produce substantially laminar inflow of liquid to be clarified and substantially laminar outflow of settled solids. In the form illustrated, box 1 is narrow, sloping, and rhomboidal.

Perforated pipe 5 is placed inside the closed top part of box 1. The clarified fluid is removed by means of siphon 6 connected to the extension of pipe 5. The siphon as shown includes a transparent inspection pipe 7, inlet valve 8 and discharge valve 9. Inlet valve 8 is used in applying outside vacuum while starting the operation. Suction created in box 1 is controlled manually or automatically through valve 9. Perforations which can be designed in many different ways in pipe 5 are preferably directed toward the obtuse top corner of box 1. Both ends of pipe 5 may be provided with threads for attachment of siphon to either or to both ends. If one siphon only is used, the other end of pipe 5 must be closed. Valve 10 on top of box 1 is used to let air in or out as may be required especially before starting or after stopping the apparatus.

The rhomboidal sedimentation unit or element illustrated in FIGS. 1 and 2 is drawn to have 60° inclination. Tests, however, have been carried out at various inclinations ranging from 30° up to 80°. The inclination may naturally be varied within reasonable limits without an essential change in the basic principle of operation.

In order that any number of such units or elements can be easily combined into a sedimentation aggregate shown in FIG. 3, hooks 11 and lugs 12 are attached to box 1. By placing beams 13 below lugs 12 on both sides of the aggregate, any number of elements can be carried by beams 13. Extensions 14 are included in cases where the sedimentation aggregate is to be supported e.g. on the rims of the sedimentation tank. If desired, the elements may be attached to beams 13 by bolts 15, or by any other convenient means. By this arrangement, any of the elements may be easily withdrawn and replaced by a new one. It should be clear that the aggregate can be built in various ways, e.g. of preshaped or prepressed forms which when piled together produce the characteristic pattern obvious from FIG. 3.

One form of the final sedimentation apparatus described in this invention is shown in FIG. 4. Sedimentation aggregate 16 is placed into sedimentation tank 17 in such a way that the top of the aggregate is substantially below the rim of tank 17. Feed is admitted through pipe 18 first into feed box 19 attached to tank 17. From box 19 pulp overflows weir 20, without undue turbulence, into tank 17. During continuous operation, pulp level in tank 17 assumes a position roughly indicated by lines 21. Sedimentation aggregate is fully or substantially fully immersed in the pulp body. For emergency, the tank may be provided with launder 22 which will prevent tank 17 from overflowing at all sides in case of trouble.

The principle of the flow of material during continuous process is now as follows:

After feed pulp is introduced into tank 17 in one or in a number of places, the primary direction of flow must take place downward because there is no normal overflow possibility in the apparatus shown in FIG. 4. Accordingly, the pulp descends in the space defined by the side walls of aggregate 16 and the walls of tank 17. A certain fraction consisting of the coarsest solids with some of the fines continue their way down directly to the conical extension 23 in the bottom of tank 17. The rest of the pulp, however, will flow into the individual boxes of aggregate 16 through siphon openings 3 thereof, and, after changing the direction of flow, will start to ascend by laminar flow into such sedimentation boxes or elements under the positive suction influence caused by the discharge of the liquid through siphon 6. The solids separated in the sedimentation elements will be discharged by gravity and by hydrostatic pressure through the open discharge channels 4 also into extension 23, while the fluid fraction is discharged at any desired rate through siphons 6. The two streams of thickened products accumulate into extension 23 and are discharged from the apparatus through discharge openings 24. The fluid fractions from siphons 6 are collected in launder 25.

It should be understood that a number of various possibilities, obvious to a specialist in this art, exist for the technique of discharging the fluid fractions under controlled suction, as well as for collecting the said fractions into one final stream. Similarly, it should be clear that various methods exist for the technique of discharging the thickened fraction, of which controlled gravitational flow and pumping by means of diaphragm pumps are conventional. Furthermore, various mechanical means can be applied within extension 23 for further thickening of the settled solids as well as for moving the sludge toward the discharge places.

One very important field of application of the apparatus described in this invention consists of such a combination that a desired number of sedimentation aggregates 17 are placed into a conventional thickener whereby its processing capacity is greatly increased. In such cases operation can be arranged also so that discharge of the fluid takes place partly by overflow as in conventional practice and partly by controlled laminar flow through the aggregates. The final discharge of the thickened fraction takes place as in conventional practice.

The effectiveness of the invention in general and its applicability in combination with a thickener of conventional design in particular can be demonstrated by the following test result typical of a large number of experiments conducted in various industrial plants:

Test elements designed substantially as described in this invention were immersed into a conventional thickener in actual use in a mineral dressing plant. Simultaneous samples were taken from the thickener overflow discharged at the normal rate and from the streams discharged at various measured rates through the siphons attached to the test elements. The samples were analyzed in respect to their content of solids. The capacity to separate liquid was expressed in both cases in liters of liquid per square meter of horizontal cross-sectional surface in a minute. A typical test result was as follows:

|  | Rate of flow in liters/m.$^2$ min. | Percent solids in liquid discharge |
| --- | --- | --- |
| Conventional thickener | 60 | 1.12-1.28 |
| Test units designed as described in this invention. | 60 | 0.25 |
|  | 130 | 0.43 |
|  | 500 | 0.87 |
|  | 680 | 0.98 |
|  | 880 | 1.08 |
|  | 1,100 | 1.14 |
|  | 1,480 | 1.26 |
|  | 1,990 | 1.45 |

It can be seen that, for equally clear liquid discharge, the capacity of the test units expressed in liters/m.$^2$ min. was from 15 to 25 times as great as the capacity of the conventional thickener. For equal capacity, the solid content of the liquid obtained through the test unit was only 20% of that carried by the thickener overflow.

Qualitatively it can be stated that the smaller the angle of inclination of the baffles in respect to horizontal, the higher the capacity of the sedimentation aggregate, all other variables remaining unchanged. Thus a unit placed at 45° angle gives a higher capacity than a similar unit placed at 60° angle. Furthermore, it can be stated that the narrower and the longer the element, the more effective is the separation.

It is of interest to note that the capacity of the sedimentation unit is so great as to be difficult, if not impossible, to study under normal laboratory conditions. Therefore all testing has been performed in industrial plants under normal processing conditions.

The sedimentation apparatus described in this invention can be designed so as to have no moving parts. If desired, however, the sedimentation aggregate may be vibrated, especially to aid the discharge of the settled solids through discharge channels 4. Similarly, the sedimentation tank may be provided with one or more vibrators placed preferably on the outside of the tank. Furthermore, the sedimentation tank may be provided with mechanical means to help the discharge of the settled solids as pointed out already earlier.

Basically, the sedimentation aggregate can be made of any material which will not dissolve nor badly corrode in the liquid into which it is immersed. Preferably it is made of light synthetic materials, or of glass, rubber, aluminum, steel plate, alloyed steel plate, or of any combination of such materials. The sloping walls of box 1 can be straight or corrugated to provide additional surface. The sedimentation aggregate may also be made up of elements of different shapes and constructions, even having more than one sedimentation channel each.

The sedimentation tank may be of any proper shape and construction. It can be built e.g. of wood, concrete, steel plate, alloyed steel plate, synthetic material, or of any combination of such materials.

It is well known that the rate of sedimentation is affected by a number of variables. In many cases it is radically influenced e.g. by addition of certain chemicals which increase the state of flocculation of the solids. Such sedimentation aids can naturally be applied to the best possible economical effect to increase further the sedimentation capacity of the present apparatus. The chemicals may be added with the pulp flowing into the tank, even into the sedimentation elements. In a number of cases it has been observed that sedimentation by means of the principle and the apparatus described in this invention will produce without flocculation aids substantially the same settling capacity as obtainable in conventional equipment with these aids.

Furthermore it is well known that the rate of sedimentation depends very strongly on the dilution of the feed pulp, in this particular case of the pulp entering the sedimentation aggregate. The more dilute the pulp, the greater in general terms the rate of sedimentation. One novel method by which this feature can be advantageously applied is as follows:

Feed to the sedimentation circuit is first pretreated by means of a hydrocyclone whereby two products will be obtained, one consisting of thickened slurry carrying the bulk solids, the other of dilute pulp carrying a part of the finer solids. So far, all attempts to use a hydrocyclone alone as a thickener have failed because of the face that the cyclone overflow has not been clear enough. The present invention offers a very convenient method and apparatus for the clarification of the cylone overflow, which is now retreated in a separate sedimentation tank and sedimentation aggregate as explained before. The second sedimentation step takes place in the sedimentation tank during the descending cycle of the pulp flow. After this the suspension to be finally introduced into the sedimentation aggregate will be still more dilute. In the third sedimentation step taking place within the sedimentation elements, the very high dilution favors now very rapid settling, which finally results in a particularly high discharge rate of the clear fluid fraction and at the same time in high overall capacity of the entire apparatus. This same principle can be applied in place of the well known counter-current decantation system consisting of say 4 large thickeners, whereby the thickeners would be replaced by a combination of four pumps, four small cyclones and four relatively small sedimentation tanks provided with sedimentation aggregates. The arrangement and the merits of the proposed system are obvious to anyone skilled in the art.

Certain automatic methods of control known to a specialist in the field can be applied in the practice of this invention to regulate especially such variables as the solid consistency of the thickened product, its rate of discharge, pulp level within the sedimentation tank, and the rate of discharge of the separated liquid. If the liquid is discharged by means of siphons, these have the natural ability to even out possible fluctuations in operation. With increasing height of the pulp level in the tank, hydrostatic head for the discharge system increases, whereby the rate of flow through the discharge siphons is also increased. With descending height of the pulp level, the reverse is true.

The apparatus described in this invention can be applied in all cases where the solids, organic, inorganic or metallic, have the ability to settle in the ambient fluid.

It is to be understood that the various details of construction of the apparatus shown and described above should not be limited to those given, because modifications are obvious to any person skilled in the art.

In the field of colloid chemistry, it is well known that if two electrodes, an anode and a cathode, are placed into an electrolyte carrying colloidal particles, these particles start to migrate in the electric field created between the electrodes either toward the anode or toward the cathode depending on the surface charge of the said particles. Because the smallest particles are the most difficult to separate from the fluid by sedimentation, the above phenomenon can be advantageously applied also in the practice of this invention. Accordingly, each sedimentation element may be provided with one or more pairs of electrodes in such a way that the movement of the solids in the electric field will aid the natural settling tendency of the solids. The element itself may be built in such a way that either or both of the two opposing inclined surfaces are used as electrodes. In the latter case, the vertical side walls and the top wall of the element should now be built of nonconducting material. Furthermore, two adjacent elements should be separated from each other by a nonconducting layer. The electrodes are made of any suitable metal or alloy. Electric current for the electrodes is obtained from any suitable source by conventional means.

What I claim is:

1. Wet sedimentation apparatus, comprising a sedimentation tank; means for introducing liquid to be clarified into said tank; a plurality of sedimentation units sequentially arranged in said tank in mutually contiguous substantially face-to-face relationship, each of said units comprising an elongate, longitudinally rectilinear box having imperforate walls, closed top, and open bottom, said bottom being of stepped formation defining separate bottom inflow and outflow openings exteriorly of the unit, said openings facing in the same direction but offset relative to and separated from each other along the length of the box by an intermediate but exterior wall, so as to produce substantially laminar inflow of liquid to be clarified and substantially laminar outflow of settled solids; discharge conduit means for clarified liquid leading from the upper part of each box to discharge outside said tank; means mounting said units in inclined positions within said tank, each with its bottom inflow opening above its bottom outflow opening, and with the bottom inflow openings of the several units at substantially a common level in said tank and the bottom outflow openings of the several units at substantially a common level in said tank; and means for discharging settled solids from said tank.

2. A self-contained sedimentation unit adapted for substantially face-to-face placement with other like units in a wet sedimentation tank, comprising an elongate, longitudinally rectilinear box having imperforate walls, closed top, and open bottom, said bottom being of stepped formation defining separate bottom inflow and outflow openings exteriorly of the unit, said openings facing in the same direction but being offset relative to and separated from each other along the length of the box by an intermediate but exterior wall, so as to produce substantially laminar inflow of liquid to be clarified and substantially laminar outflow of settled solids; discharge conduit means for clarified liquid leading from the upper part of the box, said conduit means having means to form a siphon when the unit is installed in said sedimentation tank; and means for mounting said unit in inclined position within the sedimentation tank, with the bottom inflow opening above the bottom outflow opening.

3. A sedimentation unit according to claim 2, wherein the discharge conduit means for clarified liquid and the means to form a siphon comprises piping leading laterally from the upper end of the box in an upwardly directed loop which descends in spaced relationship with said box to accommodate wall portions of the sedimentation tank.

4. A sedimentation unit according to claim 3, wherein the mounting means comprises means at the upper portion of the box for fastening the unit to the sedimentation tank structure, and means at the lower portion of the box for fastening the unit to a next adjacent unit in the sedimentation tank.

5. Wet sedimentation apparatus, comprising a sedimentation tank; means for introducing liquid to be clarified into said tank; a plurality of sedimentation units sequentially arranged in said tank in mutually contiguous substantially face-to-face relationship, each of said units comprising an elongate, longitudinally rectilinear box having imperforate walls, closed top, and open bottom, said bottom being of stepped formation defining separate bottom inflow and outflow openings exteriorly of the unit, said openings facing in the same direction but offset relative to and separated from each other along the length of the box by an intermediate but exterior wall, so as to produce substantially laminar inflow of liquid to be clarified and substantially laminar outflow of settled solids; discharging conduit means for clarified liquid leading from the upper part of each box to discharge outside said tank, said conduit means having means to form a siphon from each box when each unit is installed in said sedimentation tank; means mounting said units in inclined positions within said tank, each with its bottom inflow opening above its bottom outflow opening, and with the bottom inflow openings of the several units at substantially a common level in said tank and the bottom outflow openings of the several units at substantially a common level in said tank; and means for discharging settled solids from said tank.

6. Wet sedimentation apparatus in accordance with claim 5, wherein the discharge conduit means for clarified liquid and the means to form a siphon comprise sets of piping leading laterally from the upper ends of the respective boxes in respective upwardly directed loops which descend in spaced relationship with the corresponding boxes as siphons and accommodate wall portions of the sedimentation tank.

7. Wet sedimentation apparatus in accordance with claim 6, wherein the sedimentation tank includes superstructure; and wherein the sedimentation units include mounting means at their upper portions engaging and supported by said superstructure.

References Cited by the Examiner
UNITED STATES PATENTS

| | | | |
|---|---|---|---|
| 2,498,292 | 2/1950 | Naugle | 210—521 |
| 2,609,099 | 9/1952 | Griswold | 210—115 |
| 2,868,384 | 1/1959 | Puddington | 210—521 |

FOREIGN PATENTS

| | | |
|---|---|---|
| 43,066 | 4/1888 | Germany. |
| 746,980 | 3/1956 | Great Britain. |

REUBEN FRIEDMAN, *Primary Examiner.*

RONALD R. WEAVER, CHARLES SUKALO
*Examiners.*

D. M. RIESS, E. MOLSTEIN, *Assistant Examiners.*